April 26, 1932.   R. T. KEMPER   1,855,802
TANK INSULATION
Filed June 20, 1929
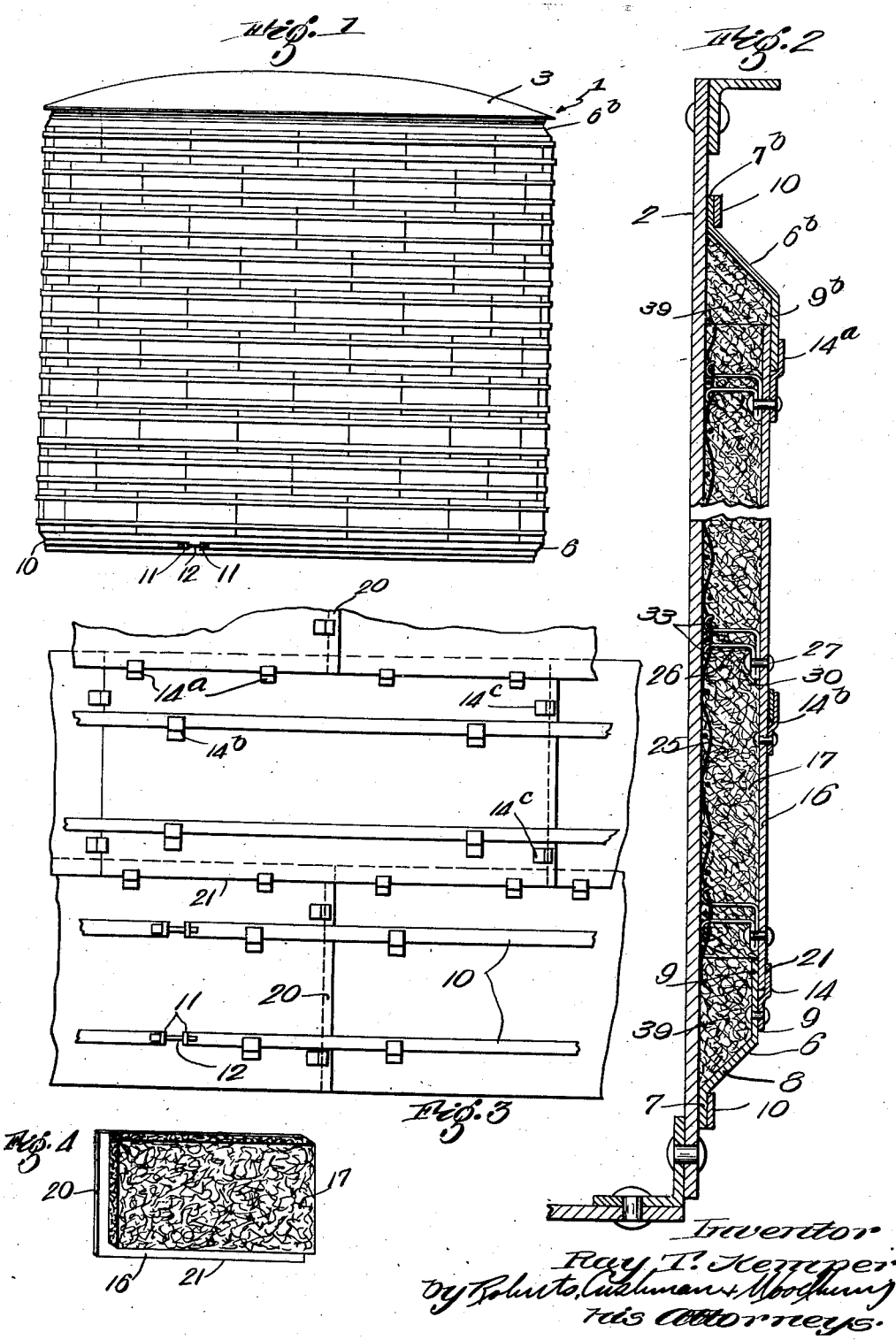

Patented Apr. 26, 1932

1,855,802

UNITED STATES PATENT OFFICE

RAY T. KEMPER, OF DESTREHAN, LOUISIANA

TANK INSULATION

Application filed June 20, 1929, Serial No. 372,412, and in Germany March 27, 1929.

This invention relates to insulation for tanks or other receptacles to impede the flow of heat between the contents of the same and the surrounding air. For example, an insulating arrangement of this character is particularly desirable to prevent the loss of heat from storage tanks containing hot or warm liquids such as petroleum oils, asphalts or coal tars.

Without insulation, the metal walls of the conventional cylindrical tank, which are built up of courses of overlapped metal plates, permit ready conduction of heat between the interior or contents of the tank and the surrounding atmosphere. A large portion of this heat loss ordinarly takes place through the side walls of the tank, which are in contact with the contained liquid since the heat loss through the roof, which is in contact with the vapors rising from the hot liquid, is comparatively small; in fact appropriate insulation applied to the side of a cylindrical tank will reduce the heat loss therefrom as much as eighty-five per cent. While the desirability of a heat insulating arrangement to protect the metal walls of liquid containing tanks has long been recognized, the practical difficulties involved in applying insulating jackets to such walls have prevented the general adoption of such means. Not only it is necessary to arrange the protective insulating layer in such a manner that air circulation between the atmosphere and the surface of the metal walls is substantially prevented, but so that the insulating material will not deteriorate due to the effect of moisture. The cylindrical walls of the tank do not provide means for ready attachment of the conventional insulating materials. It is undesirable to rivet or otherwise connect exterior structural members to the tank by means requiring drilling of the metal walls, since the likelihood of leakage would thus be increased and it would be impossible to apply insulation in this way while the tank is being used. Furthermore, connection of supporting structure for the insulating layer by welding or the like would be exceedingly troublesome and the cost of the same would be practically prohibitive. Changes in the temperature of a tank formed of metal plates cause a considerable variation in its dimensions, both circumferentially and vertically. It is therefore necessary to arrange the waterproof covering for the insulating material and the supporting means therefor in such a manner that it will not be adversely affected by the expansion or contraction of the tank.

In accordance with the present invention, an insulating arrangement is provided, which is designed to avoid these deficiencies, and which will permit the ready application of insulating material to the cylindrical wall of the tank without necessity for access to the interior thereof or for drilling holes or the like. To this end, friction is depended upon to retain the insulating material in engagement with the walls of the tank. Furthermore, the insulating structure is formed of expansible retaining elements and overlapping slab portions so that expansion and contraction of the tank, both vertically and horizontally, may occur without interfering with insulating efficiency, or causing undue structural strain upon the tank itself or the insulating jacket. To this end, I prefer to provide a plurality of insulating slabs which are disposed in frictional engagement with the outer wall of the tank, and which are held in place by circumferential tension members, the elasticity of which is sufficient to permit them to expand in response to an increase in the diameter of the tank. Since the slabs are held frictionally against the tank, some freedom of vertical movement between the insulating material and the tank wall is permitted, thus allowing the insulating jacket to accommodate itself to changes in vertical dimensions of the tank.

Preferably the insulating slabs are provided with overlapping marginal portions, so that relative movement between these marginal portions may take place without exposing the wall of the tank to the exterior air. In the preferred embodiment of the invention the insulating slabs are formed of outer layers of sheet material such as sheet metal and inner layers of insulating material secured thereto, the outer sheets having marginal portions extending beyond a horizontal and vertical margin of the insulating layer. These sheets accordingly may be arranged in overlapping engagement with each other so that relative movement between the same may occur upon expansion of the tank, without permitting exterior drafts of air to reach the wall of the tank. Furthermore the overlapping plates form a continuous waterproof protective sheath for the insulating material. Preferably, suitable supporting elements such as metal clips are secured adjoining the marginal portions of each course of slabs in order to support the overlapping sheet portions of an adjoining course of slabs in proper position. Also other metal clips are preferably provided to receive and properly to position the metal tension straps. This arrangement provides an insulating structure that is adapted adequately to protect the wall of the tank, while being capable of accommodating itself to the expansion of the tank, and permits the employment of a wide variety of insulating materials which need not be water-resistant and which do not need to be characterized by high structural strength.

In the accompanying drawings:

Fig. 1 is an elevational view of a tank with my improved insulating structure applied thereto, certain supporting clips being omitted to permit clarity of illustration;

Fig. 2 is a broken sectional view of the wall of the tank and the insulating structure applied thereto;

Fig. 3 is an elevational view of a portion of the outer face of the insulating structure; and Fig. 4 is a perspective view of a typical insulating slab.

Referring to the accompanying drawings, which are illustrative of one typical application of my invention, the numeral 1 designates a cylindrical tank which may be formed in any conventional manner and provided with a substantial continuous outer wall 2 built up of metal plates or the like. The roof 3 of the tank may be of any desired construction and forms no part of the present invention.

In accordance with this invention, a lower flashing assembly 6 is preferably secured to the outer wall of the tank adjoining the bottom of the same. Preferably this flashing assembly has a lower flange 7 in contact with the metal wall of the tank, an outwardly and upwardly inclined body portion 8 and a substantially vertical disposed flange 9. The flashing assembly preferably may be formed in a plurality of sections of convenient dimensions in accordance with the size of the tank to which it is applied. The flange 7 of the assembly 6 is preferably held frictionally against the wall 2 of the tank by a tension strap 10 which may have outturned ends 11 connected by threaded fastening means 12. Preferably the vertical portion 9 of the member 6 is provided with a plurality of clips 14 which provide sockets for engagement with the outer sheets of the lower course of insulating slabs.

Each of these slabs may be formed of an outer layer of sheet material 16 such, for example, as sheet copper, asbestos board or any suitable weather-resistant material, and with an inner layer 17 of a suitable heat insulating material such, for example, as asbestos fiber, rock or mineral wool, diatomaceous earth, or an insulating layer may be built up of attached successive layers of thin, brilliant surfaced, radiating metal such as aluminium. Preferably the insulating layer 17 is arranged to have a smaller area than the exterior protective sheet 16, the latter being provided with a marginal end portion 20 and a depending marginal portion 21 extending beyond the corresponding edges of the insulating layer 17. Thus the depending marginal portion 21 of the lower course of slabs is received by the clips 14 of the flashing member 6, overlapping the upright portion 9 of the same.

If the heat insulating material is employed that is not form retaining, I may provide a layer of coarsely meshed wire 25 upon the inner face of the insulating material, and connect suitable wire elements 26 to the sheets 16 by rivets 27 or the like. Preferably the wire elements 26 are of U-shape with their legs bent at right angles, so that the bight portions 30 thereof may be engaged under the heads of the rivets and so that their legs may extend through the layer 17 of insulating material having their extremities hooked over portions of the wire mesh member 25 as designated by numeral 33.

Obviously in the case of stronger, form retaining insulating materials, the wire mesh member may be omitted and the wire ties 26 may be engaged directly with the inner surface of the insulating layer, or the latter may be adhesively secured to the outer sheet, as shown in Fig. 4. It is thus evident that means may be provided to permit the ready connection of practically any desired insulating material to the protective and supporting plates 16.

Preferably the succeeding courses of slabs are disposed above the first course with depending marginal portions 21 engaging clips 14$^a$ corresponding to the clips 14 of the flashing member; these courses may be staggered as shown, and have overlapping vertical edges 20 as illustrated in Fig. 3. Clips 14$^c$ may be provided to engage the overlapping edges; more accurately to position the same, if desired.

Preferably each course of insulating slabs is secured in place by a tension strap or straps 10 of the same type as that applied to the flash member 6. In order readily to position these straps, a plurality of clips 14$^b$ may be disposed intermediate the height of each of the sheets 16. As succeeding courses of slabs are located in place, the tension straps for the same are tightened so that the next course of slabs may readily be supported thereby until its own tension straps are suitably tightened. At the top of the insulating structure, a flash member 6$^b$, similar to the member 6, but inverted so that its vertical portion 9$^a$ engages the clips 14$^a$ of the upper course of insulating slabs is provided. A suitable tension strap 10 holds the flange 7$^b$ of the flash member 6$^b$ in place. It is evident that any suitable insulating material 39 may be disposed between the flash strips 6 and 6$^b$, and the wall 2 of the tank, such material being secured to the flash strips in the same manner as the insulating blankets 17 are connected to the plates 16 if desired, or merely being packed into the space between the flash strip and the wall of the tank, if desired.

While the accompanying disclosure and foregoing description are particulary directed to the one preferred form of this invention, it is obvious that the principles of the same may be widely varied without departing from the spirit thereof. For example, the insulating jacket may be similarly applied to a cylindrical tank having its axis horizontally disposed as is the conventional tank car.

It is evident that this manner of providing an insulating structure or jacket for a cylindrical tank or the like, affords a waterproof covering so that the insulating blanket itself may be formed of material that is not highly water-resistant, if desired, and further that all necessity for welding to or drilling into the tank wall is avoided. Furthermore, the insulating slabs are effectively held in place against the container wall to provide a continuous protective or insulating sheath despite expansion and contraction of the tank due to changes in the temperature of the same, such as will result for example from the filling of the tank with a hot liquid. The tension straps have a comparatively high tensile strength and sufficient elasticity to permit the insulating jacket to conform to these changes in the size of the tank and yet to hold the same in place and readily to withstand the expansion stresses imposed thereon. The overlapping arrangement of the margins of the slabs permits their relative movement as necessitated by expansion or contraction of the tank while continuing to protect the tank from the exterior air and protecting the insulating material from the intrusion of moisture.

I claim:

1. Insulating structure for a tank comprising a plurality of insulating slabs engaging the tank wall, and a plurality of tension members extending about the tank and engaging the outer faces of the slabs frictionally to hold the latter against the tank and clips mounted upon the outer faces of the slabs and receiving the tension members while permitting relative sliding movement between the clips and said members.

2. Insulating structure for a tank comprising a plurality of insulating slabs, engaging the tank wall, and a plurality of tension members extending about the tank and engaging the outer faces of the slabs frictionally to hold the latter against the tank, each of said slabs comprising an outer layer of water-resistant, form-retaining sheet material and an inner layer of foraminous insulating material secured to the outer layer, said outer layers having substantially vertical and horizontal marginal portions projecting beyond the edges of the corresponding inner layers and overlapping adjoining slabs and clips upon the outer layers frictionally engaging the outer faces of the tension members.

3. Insulating structure for a tank comprising a plurality of insulating slabs engaging the tank wall, and a plurality of tension members extending about the tank and engaging the outer faces of the slabs, frictionally to hold the latter against the tank, each of said slabs comprising an outer layer of water-resistant, form-retaining sheet material and an inner layer of foraminous insulating material secured to the outer layer, the slab portions in said outer layer having lower marginal portions depending below the corresponding inner layers and overlapping the outer faces of the outer layers of the adjoining lower course of slabs, and means carried by the upper portions of the outer layers to position and support said depending marginal portions.

4. Insulating structure for a tank comprising a plurality of insulating slabs engaging the tank wall, and a plurality of tension members extending about the tank and engaging the outer faces of the slabs frictionally to hold the latter against the tank, each of said slabs comprising an inner layer of heat insulating material and an outer layer of water-resistant, form-retaining sheet material secured to the outer layer, said outer layers having substantially vertical and horizontal marginal portions projecting beyond the edges of the corresponding inner layers and overlapping adjoining slabs, said inner layers having edge faces in mutual juxtaposition.

5. Insulating structure for a tank comprising a layer of heat insulating slabs, a plurality of tension members engaging the outer faces of the slabs and holding the same in place, a flash strip at a horizontal edge of the slab layer, said strip having a flange portion in direct engagement with the tank, a tension member holding said flange portion in place, and a portion of the flash strip spaced from the tank wall and connected to the adjoining slab layer.

6. Insulating structure for a cylindrical tank comprising a plurality of insulating slabs engaging the tank wall, and a plurality of tension members extending about the tank and engaging the outer faces of the slabs frictionally to hold the latter against the tank, each of said slabs comprising an outer layer of water-resistant, form-retaining sheet material and an inner layer of foraminous insulating material secured to the outer layer, the sheets of said outer layer having lower marginal portions depending below the corresponding portions of the inner layer and overlapping the outer faces of the outer layers of the adjoining lower course of slabs, and socket elements carried by the upper portions of the sheets of the outer layer to receive the depending marginal portions of the sheets of the next course of slabs.

7. Insulating structure for a vertical cylindrical tank well comprising a plurality of insulating slabs surrounding and engaging the tank wall, said slabs being arranged in circumferential courses around the tank, each course comprising a multiplicity of slabs, and tension members extending about each circumferential course and engaging the outer faces of the slabs frictionally to hold the latter against the tank, said slabs having substantially vertical and substantially horizontal marginal portions in overlapping engagement with each other whereby a substantially continuous heat insulating layer may be maintained despite expansion and contraction of the tank.

8. Insulating structure for a tank having a vertical cylindrical wall comprising a layer of foraminous heat insulating material adjoining the tank wall, a layer of overlapping plates disposed about said heat insulating material, said plates having both vertical and horizontal overlapping edges, and a plurality of tension members extending about the plates and being spaced from the tank and engaging the outer faces of the plates frictionally to hold the heat insulating material against the tank.

9. Insulating structure for a cylindrical tank comprising a plurality of insulating slabs engaging the tank wall and a plurality of tension members extending about the tank and engaging the outer faces of the slabs frictionally to hold the latter against the tank, each of said slabs comprising an outer layer of water-resistant, form-retaining sheet material, and an inner layer of foraminous insulating material secured to the outer layer, said outer layers having lower marginal portions depending below the corresponding portions of the inner layers and having end marginal portions projecting beyond the ends of the corresponding portions of the inner layers, said marginal portions overlapping the outer faces of outer layers of adjoining slabs, and elements carried by the upper portions of the outer layers to receive the depending marginal portions of the sheets thereabove, whereby the outer sheets have marginal portions held in frictional engagement adapted to slip in relation to each other in response to thermal expansion and contraction of the tank wall.

10. Insulating structure for a cylindrical tank comprising a plurality of insulating slabs engaging the tank wall and a plurality of tension members extending about the tank and engaging the outer faces of the slabs frictionally to hold the latter against the tank, each of said slabs comprising an outer layer of water-resistant, form-retaining sheet material, and an inner layer of foraminous insulating material secured to the outer layer, said outer layers having lower marginal portions depending below the corresponding portions of the inner layers and having end marginal portions projecting beyond the ends of the corresponding portions of the inner layers, said marginal portions overlapping the outer faces of outer layers of adjoining slabs, and elements carried by one end of each of the outer layers of the slabs engaging the overlapping end marginal portions of adjoining slabs to hold the end margins of the outer layers in frictional engagement.

Signed by me at Hamburg, Germany, this 4th day of June, 1929.

RAY T. KEMPER.